(12) United States Patent
Nanik

(10) Patent No.: US 12,160,695 B1
(45) Date of Patent: Dec. 3, 2024

(54) MAGNETIC MODULAR AUDIO DEVICE

(71) Applicant: Amwood (Hong Kong) Limited, Sheung Wan (HK)

(72) Inventor: Shaan Nanik, Garden Terrace (HK)

(73) Assignee: Amwood (Hong Kong) Limited, Sheung Wan (HK)

( * ) Notice: Subject to any disclaimer, the term of this patent is extended or adjusted under 35 U.S.C. 154(b) by 0 days.

(21) Appl. No.: 18/737,598

(22) Filed: Jun. 7, 2024

(30) Foreign Application Priority Data

Mar. 28, 2024 (CN) .......................... 202420622410.9

(51) Int. Cl.
 *H04R 1/02* (2006.01)
 *G06F 3/16* (2006.01)
 *H04R 3/12* (2006.01)
 *H04R 7/12* (2006.01)

(52) U.S. Cl.
 CPC ............. *H04R 1/026* (2013.01); *G06F 3/165* (2013.01); *H04R 1/023* (2013.01); *H04R 1/025* (2013.01); *H04R 3/12* (2013.01); *H04R 7/12* (2013.01); *H04R 2420/07* (2013.01)

(58) Field of Classification Search
 CPC ... H04R 1/026; H04R 1/025; H04R 2201/025

USPC .......... 381/111, 374, 87, 332, 361, 366, 386
 See application file for complete search history.

(56) References Cited

U.S. PATENT DOCUMENTS

| | | | |
|---|---|---|---|
| 5,900,715 A * | 5/1999 | Roberts | H01M 10/46 320/115 |
| 7,804,966 B2 * | 9/2010 | Adams | H04R 1/02 381/87 |
| 9,374,633 B2 * | 6/2016 | Adams | H04R 1/02 |

\* cited by examiner

*Primary Examiner* — Disler Paul
(74) *Attorney, Agent, or Firm* — Aasheesh V. Shravah; CM Law

(57) ABSTRACT

A magnetic modular audio device includes a plurality of magnetic modular audio units. A speaker is provided on a front side of the audio unit, and a diaphragm is provided on a back side thereof. A top surface of the audio unit is provided with a connection contact and a bottom surface of the audio unit is provided with an elastic contact pin corresponding to the connection contact. A plurality of the audio units can be stacked with each other with the connection contact(s) of one of two adjacent layers of the audio unit(s) in contact with the elastic contact pin(s) of the other layer of the audio unit(s) to form a circuit and signal connection between the audio units. The plurality of audio units can be easily combined and can each produce sound simultaneously.

7 Claims, 5 Drawing Sheets

MAGNETIC MODULAR AUDIO DEVICE

This application claims priority to Chinese Application No. 202420622410.9, filed on Mar. 28, 2024, entitled "MAGNETIC MODULAR AUDIO DEVICE".

TECHNICAL FIELD

The present utility model relates to the technical field of audio equipment, specifically a magnetic modular audio device.

BACKGROUND ART

Audio equipment specifically refers to a set of audio systems composed of electrical devices that can produce sound. The development history of audio technology can be divided into four stages: vacuum tubes, transistors, integrated circuits, and field-effect transistors. With the progress of society, people yearn for a more colorful life. Singing and dancing, as a form of entertainment that has been passed down for thousands of years, have deeply penetrated the lives of people from various ethnic groups. However, with the advancement and progress of technology, people have increasingly higher and more diverse requirements for the forms and venues of singing and dancing performances. Audio systems have been continuously improved and refined to meet people's needs. They range from large systems that satisfy the sound amplification needs of concerts with tens of thousands of people to small systems that cater to individual home needs for playing musical instruments and karaoke.

Traditional audio equipment is typically composed of a single box, making it difficult to quickly assemble and disassemble a plurality of audio units. In addition, the traditional audio equipment has certain limitations in signal transmission and power supply, which cannot meet users' diverse needs for multi-channel, high power, and high fidelity sound.

SUMMARY OF THE UTILITY MODEL

In order to overcome the problems mentioned above, the present utility model aims to provide a technical solution(s) that can solve these problems.

A magnetic modular audio device includes a plurality of magnetic modular audio units, a speaker is provided on a front side of the audio unit, a diaphragm is provided on a back side thereof, magnets are respectively installed on a top part and a bottom part of the audio unit, a top surface of the audio unit is provided with a connection contact, a bottom surface of the audio unit is provided with an elastic contact pin corresponding to the connection contact, a plurality of the audio units is stacked with each other with the connection contact of one of two adjacent layers of audio unit in contact with the elastic contact pin of the other layer of audio unit to form a circuit and signal connection between the audio units.

Furthermore, the magnetic modular audio device further includes a circuit board connected to the speaker, the connection contact and the elastic contact pin, and a control panel connected to the circuit board, the speaker is arranged on a front end surface or a back end surface of the audio unit, and the control panel is arranged on a side of the audio unit.

Furthermore, mesh covers are respectively provided on the front side and the back side of the audio unit.

Furthermore, the top surface of the audio unit is provided with a protruding part, and the bottom surface thereof is provided with a recessing slot matching the protruding part in shape, a long alignment strip and a short protruding part are provided on the protruding part, and alignment slots corresponding to the alignment strips are provided in the recessing slot.

Furthermore, the audio unit is provided with a battery connected to the circuit board, and a charging port is provided on the control panel.

Furthermore, a Bluetooth module is integrated on the circuit board.

Compared to the existing technologies, the present utility model has the following beneficial effects: one of a plurality of audio units can serve as a main audio input unit. When the plurality of audio units is stacked, the connection contacts and elastic contact pins between two adjacent layers of audio units can be connected to form a circuit and signal connection. This allows the plurality of audio units to be easily combined and synchronized to produce sound, thereby achieving a multi-channel effect. Moreover, since the plurality of audio units are synchronized to produce sound, the simultaneous superposition of a plurality of sound fields can improve the loudness and sound pressure of the audio device, thereby achieving high power and high fidelity effects. When the plurality of audio units are superimposed, with the connection structure between the audio units, only one charging cable is needed to charge the plurality of audio units at the same time. Additionally, when an audio unit is damaged, only that audio unit needs to be removed or replaced in order to continue to use the audio device, which is convenient for repair without affecting the normal use of the audio device.

Some of the additional aspects and advantages of the present utility model can be obtained in the description which follows, and some will become apparent based on the description, or can be learned by way of implementing the present utility model.

BRIEF DESCRIPTION OF THE DRAWINGS

To more clearly illustrate the technical solutions in the embodiments of the present utility model or the existing technologies, a brief introduction to the drawings used in the description of the embodiments or the existing technologies will be provided below. It is evident that the drawings provided below are merely some embodiments of the present utility model. For a person skilled in the art, other drawings can be obtained based on these drawings without creative efforts.

Figure 1:
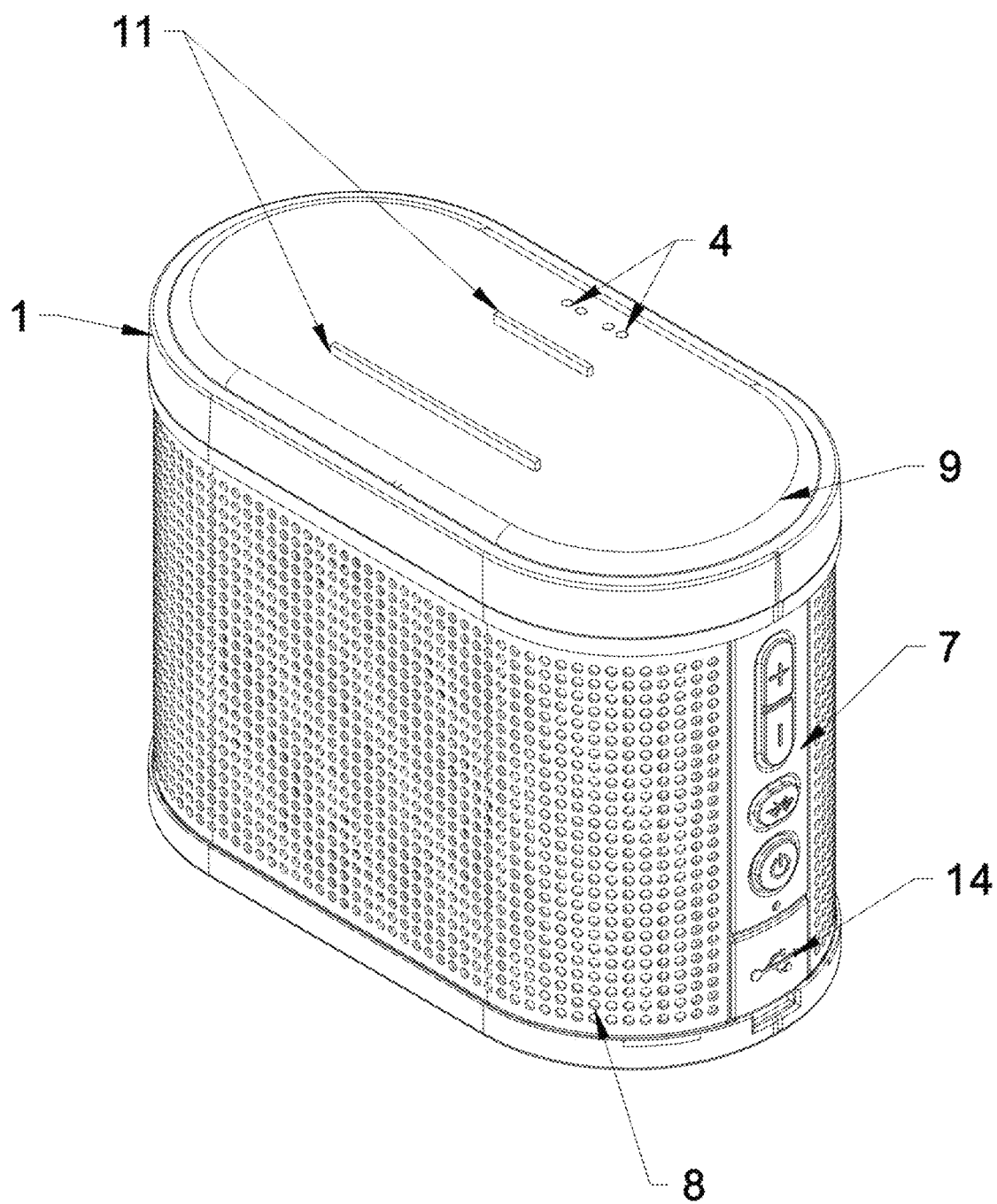
FIG. 1 is a schematic diagram of the structure of the present utility model.

In the figures: audio unit 1, speaker 2, magnet 3, connection contact 4, elastic contact pin 5, circuit board 6, control panel 7, mesh cover 8, protruding part 9, recessing slot 10, alignment strip 11, alignment slot 12, battery 13, charging port 14, Bluetooth module 15, power supply terminal J1, signal terminal J2, diaphragm 16.

DESCRIPTION OF THE EMBODIMENTS

The technical solutions in the embodiments of the present utility model will be described clearly and fully below. It is evident that the described embodiments are merely a part of the embodiments of the present utility model, not all of them. Based on the embodiments in the present utility model, all other embodiments obtained by a person of ordinary skill in the art without creative efforts shall fall within the scope of protection of the present utility model.

Figure 2:
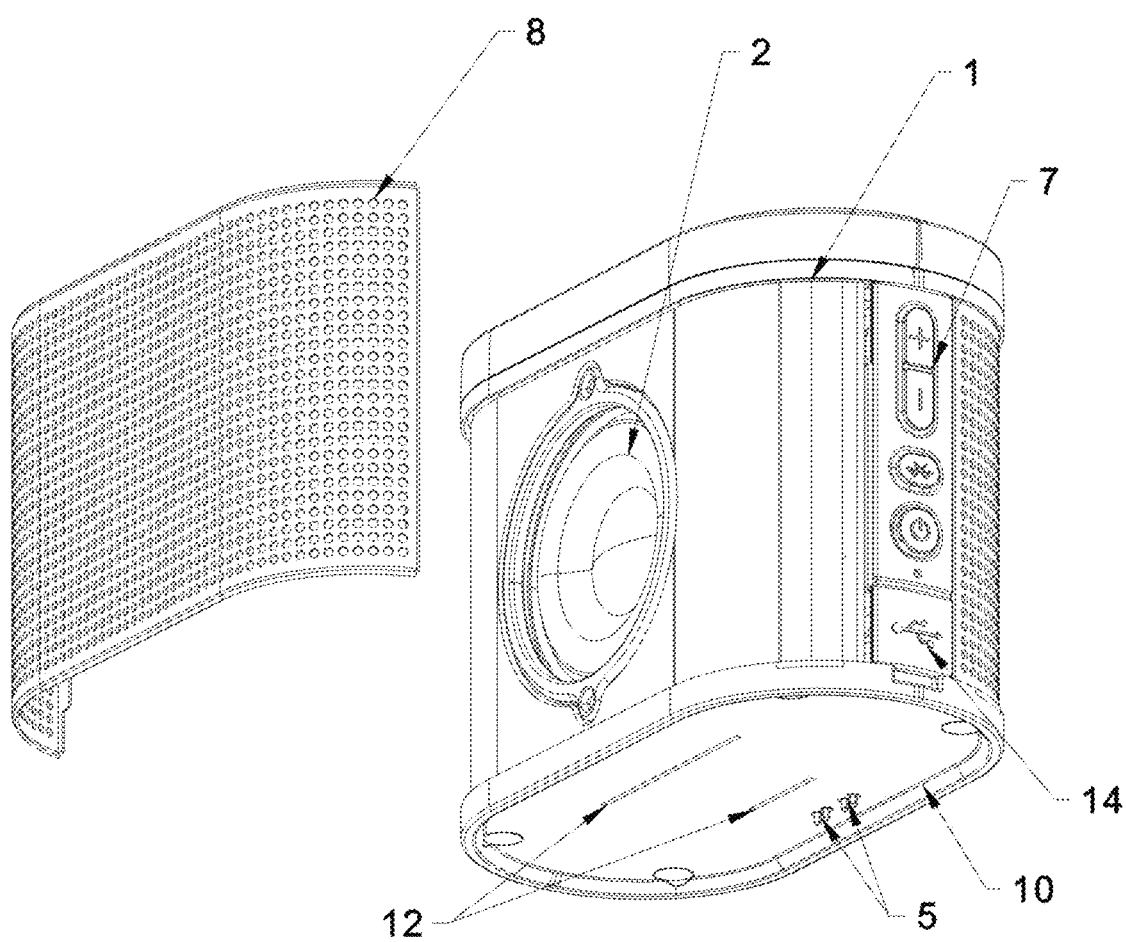
FIG. 2 is another schematic diagram of the structure of the present utility model.
Figure 3:
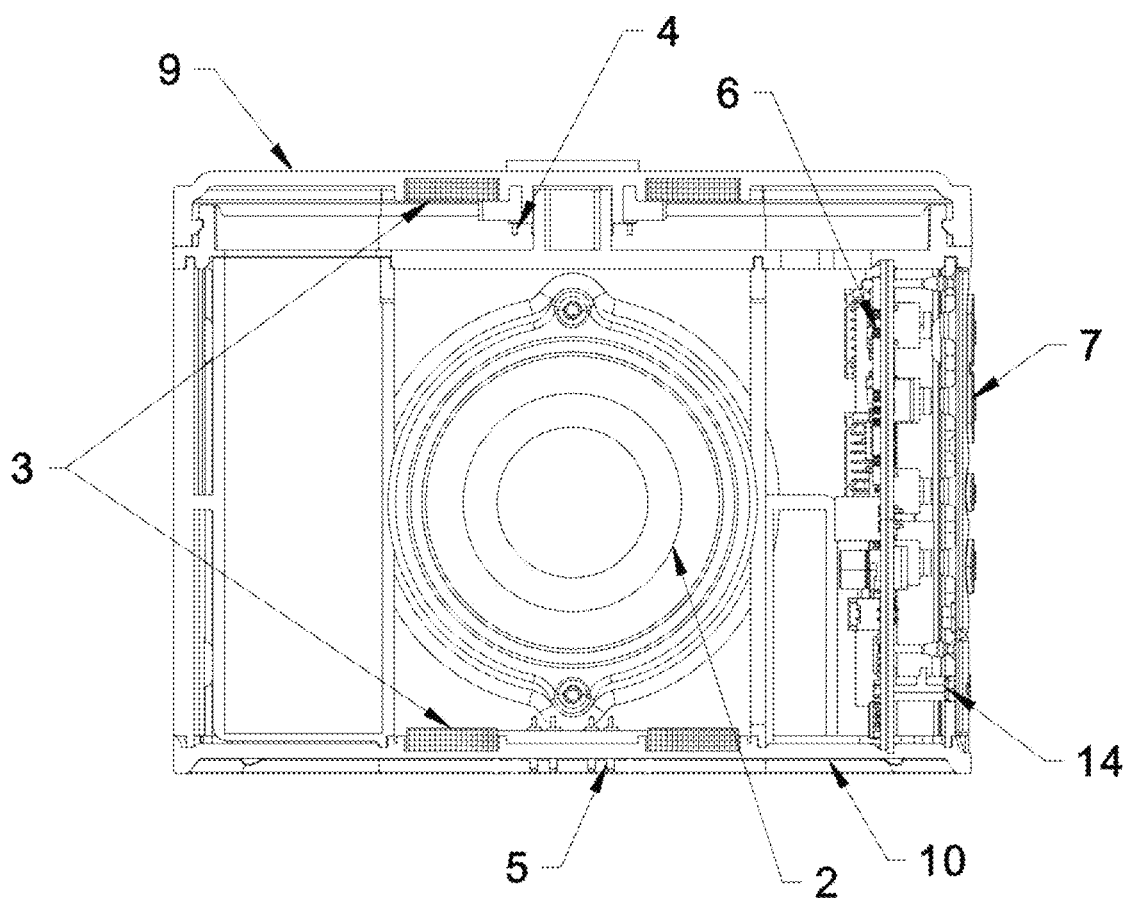
FIG. 3 is a schematic diagram of the internal structure of the present utility model.
Figure 4:
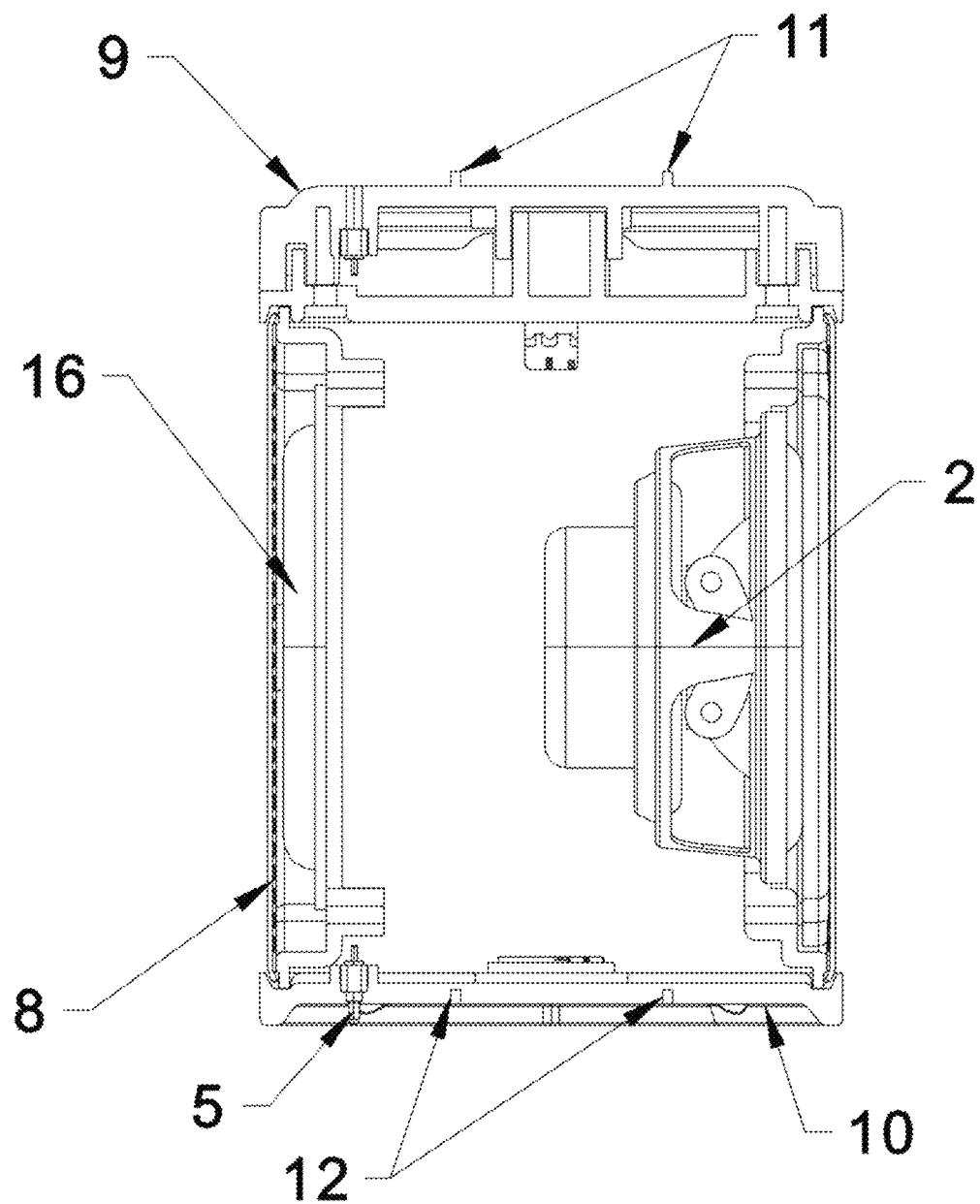
FIG. 4 is another schematic diagram of the internal structure of the present utility model.
Figure 5:
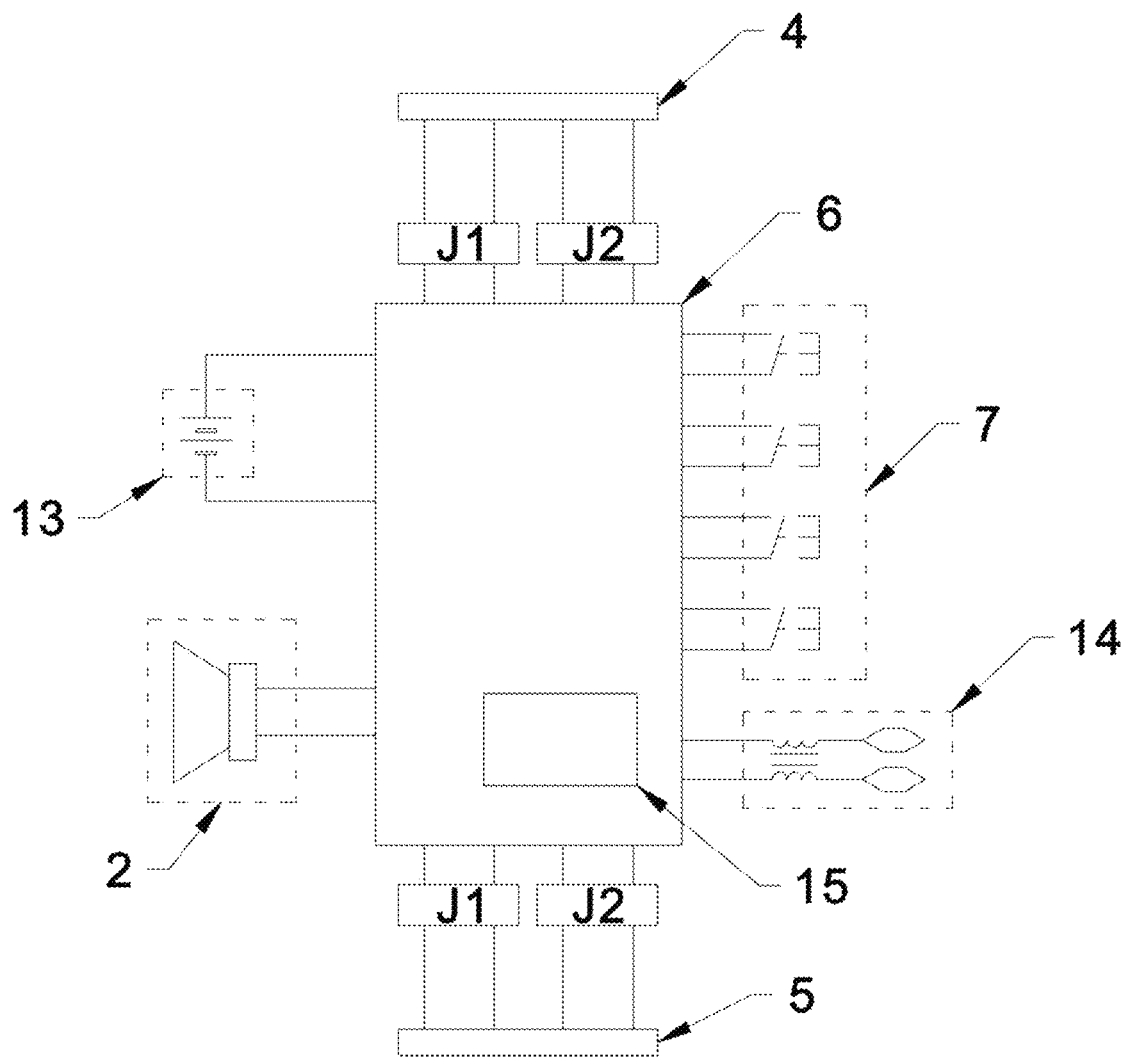
FIG. 5 is a schematic diagram of the circuit structure of the present utility model.

With reference to FIGS. 1 to 5, a magnetic modular audio device includes a plurality of magnetic modular audio units 1, a speaker 2 is provided on a front side of the audio unit 1, a diaphragm 16 is provided on a back side thereof, magnets 3 are respectively installed on a top part and a bottom part of the audio unit 1, a top surface of the audio unit 1 is provided with a connection contact 4, a bottom surface of the audio unit 1 is provided with an elastic contact pin 5 corresponding to the connection contact, a plurality of the audio units 1 is stacked with each other with the connection contact 4 of one of two adjacent layers of audio unit 1 in contact with the elastic contact pin 5 of the other layer of audio unit 1 to form a circuit and signal connection between the audio units. Specifically, one of the plurality of audio units 1 can serve as a main audio input unit. When the plurality of audio units 1 is stacked, the connection contacts 4 and elastic contact pins 5 of adjacent layers of audio units 1 can come into contact for connection, thereby establishing a circuit and signal connection. The plurality of audio units 1 can thus be easily combined and synchronized for sound production, achieving a multi-channel effect. In addition, since the plurality of audio units are synchronized to produce sound, the simultaneous superposition of a plurality of sound fields can improve the loudness and sound pressure of the audio device, thereby achieving high power and high fidelity effects. When the power of a certain audio unit 1 is low, it can be charged by means of other audio units 1. If an audio unit 1 is damaged, only that audio unit 1 needs to be removed or replaced in order to continue to use the audio device, which is convenient for repair without affecting the normal use of the audio device. The main audio input can be performed via Bluetooth, audio cables, or other input methods. Moreover, each audio unit 1 is equipped with magnets 3 on the top part and bottom part thereof, allowing the audio units 1 to be easily combined together.

Furthermore, the magnetic modular audio device further includes a circuit board 6 connected to the speaker 2, the connection contact 4 and the elastic contact pin 5, and a control panel 7 connected to the circuit board 6, the speaker 2 is arranged on a front end surface or a back end surface of the audio unit 1, and the control panel 7 is arranged on a side of the audio unit 1. Specifically, on the circuit board 6, power terminals J1 and signal terminals J2 are respectively provided to connect with the connection contacts 4 and the elastic contact pins 5. By means of the connection contacts 4 and elastic contact pins 5 between two audio units 1, the power supply and signal systems of the two audio units 1 can be integrated into one unit. This allows the two audio units to produce sound synchronously, and when the power of one audio unit 1 is low, it can be charged. According to the mechanisms described above, two or more audio units 1 can be stacked on this basis to form a multi-audio system.

Furthermore, to enhance the durability and safety of the audio device, mesh covers 8 are respectively installed on the front side and back side of the audio unit 1 to prevent dust and foreign objects from entering the interior of the audio device.

Furthermore, the top surface of the audio unit 1 is equipped with a protruding part 9, while the bottom surface thereof is provided with a corresponding recessing slot 10 that matches the shape of the protruding part 9. This design ensures a more stable combination of the audio units 1, preventing them from loosening or falling off during use. In addition, a long alignment strip and a short alignment strip 11 are provided on the protruding part 9, and alignment slots 12 corresponding to the alignment strips are provided inside the recessing slot 10. This further enhances the stability and accuracy of the connection between the audio units 1.

Furthermore, inside the audio unit 1, there is a battery 13 connected to the circuit board 6, and a charging port 14 is provided on the control panel 7, so as to facilitate users charging the audio device. In addition, the circuit board 6 is also integrated with a Bluetooth module 15, allowing the audio device to wirelessly connect to devices such as smartphones, tablets, etc., thereby enabling more convenient music playback and control. Moreover, in the case where a plurality of audio units 1 is connected, when a smart device is connected to the Bluetooth module 15 of one of the audio units 1, that audio unit 1 can output signals to temporarily disable the Bluetooth modules 15 of the other audio units 1, thereby preventing mutual interference. When the Bluetooth connection is disconnected or the audio unit 1 is removed from the system, the Bluetooth modules 15 can be reactivated.

For a person skilled in the art, it would be evident that the present utility model is not limited to the details of the exemplary embodiments described above. Other specific forms can be implemented without departing from the principles or essential features of the present utility model. Therefore, the embodiments should be regarded as illustrative and not restrictive from any point of view. The scope of the present utility model is defined by the appended claims rather than the descriptions provided above. It is therefore intended that all changes that fall within the meaning and scope of equivalent elements of the claims are included in the present utility model.

The invention claimed is:

1. A magnetic modular audio device, comprising:
   a plurality of magnetic modular audio units;
   a speaker provided at a front side of the magnetic modular audio units;
   a diaphragm provided at a back side of the magnetic modular audio units; and
   one or more magnets provided at a top portion and a bottom portion of the magnetic modular audio units;
   wherein a top surface of the magnetic modular audio units include a connection contact, and a bottom surface of the magnetic modular audio units include an elastic contact pin corresponding to the connection contact;
   wherein the plurality of the magnetic modular audio units are configured to be stacked on top of each other where the connection contact at the top surface of a first of two adjacent magnetic modular audio units is in contact with the elastic contact pin of the bottom surface of a second of the two adjacent magnetic modular audio units to form a circuit and signal connection between the adjacent magnetic modular audio units.

2. The magnetic modular audio device according to claim 1, further comprising:
   a circuit board connected to the speaker, the connection contact and the elastic contact pin; and a control panel connected to the circuit board, the control panel being provided on a side surface of the audio unit.

3. The magnetic modular audio device according to claim 2, further comprising:
a battery connected to the circuit board; and
a charging port provided on the control panel.

4. The magnetic modular audio device according to claim 3, further comprising:
a wireless module integrated on the circuit board.

5. The magnetic modular audio device according to claim 1, further comprising:
a mesh cover provided on the front side and the back side of the magnetic modular audio units.

6. The magnetic modular audio device according to claim 1, further comprising:
a protruding part provided on the top surface of the magnetic modular audio units; and
a recessing slot matching the protruding part in shape on the bottom surface of the magnetic modular audio units.

7. The magnetic modular audio device according to claim 6, further comprising:
a long alignment strip and a short alignment strip provided on the top surface, and alignment slots corresponding to the shape of the long alignment strip and the short alignment strip provided on the bottom surface.

* * * * *